United States Patent [19]

Day et al.

[11] 3,904,683

[45] Sept. 9, 1975

[54] PROCESS FOR THE RESOLUTION OF d- AND l-2-(6-METHOXY-2-NAPHTHYL) PROPIONIC ACID

[75] Inventors: John T. Day, Clarecastle, Ireland; Richard Waugh, Los Altos Hills, Calif.; Emil Lorz; Dennis W. Lyle, both of Springfield, Mo.

[73] Assignee: Syntex Corporation, Panama

[22] Filed: Oct. 29, 1974

[21] Appl. No.: 518,447

Related U.S. Application Data

[63] Continuation-in-part of Ser. No. 279,329, Aug. 10, 1972, abandoned.

[52] U.S. Cl. ............................ 260/520; 260/501.1
[51] Int. Cl.² .................................. C07C 65/00
[58] Field of Search .................. 260/501.1, 520

[56] References Cited
UNITED STATES PATENTS
3,683,015  8/1972  Dyson ........................... 260/520
3,686,183  8/1972  Dyson ........................ 260/501.11

FOREIGN PATENTS OR APPLICATIONS
803,394  2/1974  Belgium

Primary Examiner—John F. Terapane
Attorney, Agent, or Firm—Joseph I. Hirsch; William B. Walker

[57] ABSTRACT

A mixture of water-soluble salts of d- and l-2-(6-methoxy-2-naphthyl)propionic acid is treated with a salt of dehydroabietylamine, the crystallized dehydroabietylamine salt of the l-isomer is removed leaving a mother liquor enriched in the water-soluble salt of the d-isomer, an inorganic salt more soluble in water than is the water-soluble salt of the d-isomer is added to the aqueous portion of the mother liquor, and the least water-soluble salt of the d-isomer is crystallized from the aqueous portion. The crystallized salt of the d-isomer is redissolved in water and acidified to yield substantially pure d-isomer, which has anti-inflammatory, anti-pyretic and analgesic activities.

30 Claims, No Drawings

PROCESS FOR THE RESOLUTION OF D-AND 1-2-(6-METHOXY-2-NAPHTHYL) PROPIONIC ACID

REFERENCE TO PARENT APPLICATION

This application is a continuation-in-part application of application Ser. No. 279,329, filed Aug. 10, 1972, now abandoned.

FIELD OF THE INVENTION

This invention relates to a method for resolving mixtures of d and l 2-(6-methoxy-2-naphthyl)propionic acid to yield a composition containing substantially pure d-isomer.

BACKGROUND OF THE INVENTION

Prior to this invention, it was heretofore known to use dehydroabietylamine as an agent to resolve monocarboxylic acids (for example, see U.S. Pat. No. 3,454,626). In addition, mixtures of d and l 2-(6-methoxy-2-naphthyl)propionic acid have been resolved with cinchonidine, either alone or in combination with an organic amine or an inorganic base, via procedures requiring multiple crystallizations in a lower alcohol, such as methanol.

OBJECT OF THE INVENTION

It is the object of this invention to provide a process for resolving mixtures of d and l 2-(6-methoxy-2-naphthyl)propionic acid to yield a composition containing substantially pure d-isomer, such process requiring a single crystallization to remove the salt of the l-isomer produced and a single crystallization to obtain a salt of the d-isomer, followed by cleaving of the salt moiety with an inorganic acid, whereupon the d-isomer precipitates in its substantially pure form.

BRIEF SUMMARY OF THE INVENTION

In summary, the process of this invention for resolving mixtures of d and l 2-(6-methoxy- 2-naphthyl)propionic acid comprises providing a heated two-phase (aqueous/organic) system containing a salt of dehydroabietylamine and water-soluble salts of the d- and l-isomers of 2-(6-methoxy-2-naphthyl)propionic acid, holding the heated system at a temperature elevated from room temperature to promote interchange of the salt of dehydroabietylamine from the d-isomer to the l-isomer, crystallizing and removing the dehydroabietylamine salt of the l-isomer to thereby yield a mother liquor enriched in the salt of the d-isomer in the aqueous phase, separating the aqueous phase from the organic phase, and salting out a salt of the d-isomer by adding to the aqueous phase an inorganic salt which is more soluble in water than the corresponding salt of the d-isomer and crystallizing the salt of the d-isomer from the aqueous phase. The salt of the d-isomer so obtained is redissolved in water, the solution thereof is acidified, and the crystalline precipitate which results is separated by filtration and washed to thereby yield substantially pure d-2-(6-methoxy-2-naphthyl)propionic acid. If desired, this procedure can be followed by one or more additional recrystallizations to further increase the purity of the d-isomer.

More particularly, the process of this invention includes providing a heated two phase (aqueous/organic) system containing water as the aqueous phase, a water-immiscible, inert, non-polar organic solvent as the organic phase, a mixture of a water-soluble salt of d 2-(6-methoxy-2-naphthyl)propionic acid and a water-soluble salt of l 2-(6-methoxy-2-naphthyl)propionic acid, and a salt of dehydroabietylamine which is soluble in the organic phase but is insoluble in the aqueous phase at the elevated temperature to which said system is heated, holding said system at said elevated temperature promote the formation of the dehydroabietylamine salt of l 2-(6-methoxy-2-naphthyl)propionic acid which is less soluble in the two-phase system than is the dehydroabietylamine salt of d 2-(6-methoxy-2-naphthyl)propionic acid, crystallizing the dehydroabietylamine salt of l 2-(6-methoxy-2-naphthyl)propionic acid, separating the crystallized salt from the two-phase system to thereby provide a mother liquor having an aqueous phase which is enriched in the water-soluble salt of d 2-(6-methoxy-2-naphthyl)propionic acid, separating said aqueous phase from said organic phase and salting out a salt of d 2-(6-methoxy-2-naphthyl)propionic acid by adding an inorganic salt which is more soluble in said aqueous phase than is the water-soluble salt of d 2-(6-methoxy-2-naphthyl)propionic acid to said aqueous phase and crystallizing the least water-soluble salt of d 2-(6-methoxy-2-naphthyl)propionic acid from said aqueous phase in the absence of substantial amounts of impurity salts. After the solution of the salt of dehydroabietylamine is added, it is preferred to hold the two-phase system at the elevated temperature to promote the interchange of the salt of dehydroabietylamine from the d-isomer to the l-isomer. In addition, after the crystallized dehydroabietylamine salt of l 2-(6-methoxy-2-naphthyl)propionic acid is separated from the two-phase system but prior to separation of the aqueous phase from the organic phase, it is preferred to render basic the aqueous phase to drive residual dehydroabietylamine to the organic phase. The salting out of a salt of the d-isomer by adding an inorganic salt to the aqueous phase makes use of the wellknown "common-ion effect" to crystallize the less soluble salt (e.g., an alkali metal salt of the d-isomer) from the aqueous solution upon cooling. Preferred inorganic salts are those which have a flat or relatively flat solubility curve between about 10°C to about 40°C so, upon cooling, not greater than minor amounts of the inorganic salt will be co-crystallized from solution.

2-(6-Methoxy-2-naphthyl)propionic acid and methods for its preparation are described in abandoned U.S. Pat. applications Ser. No. 694,771, filed Dec. 7, 1967, and Ser. No. 741,858, filed July 2, 1968, as briefly described hereinafter. One such method involves the reaction of a 1-halo-2-methoxynaphthalene with acetyl chloride in nitrobenzene in the presence of 3 molar equivalents of aluminum chloride to yield the corresponding 2-acetyl-5-halo-6-methoxynaphthalene derivative. The resulting derivative is heated with morpholine in the presence of sulfur at 150°C, and the resulting product is refluxed with concentrated hydrochloric acid to furnish the corresponding 2-naphthylacetic acid derivative. The latter compound is then esterified such as by reacting it with an alkanol in the presence of boron trifluoride, and the ester is treated with an alkali metal hydride in an ether solvent and then with an alkyl halide such as methyl iodide to yield the corresponding 2-(6-methoxy-2-naphthyl)propionate. The latter is hydrolyzed, for example in an aqueous basic solution, to yield the corresponding 2-(6 -methoxy-2-naphthyl)propionic acid. Other procedures for the preparation of 2-(6-methoxy-2-naphthyl)propionic acid are shown, for example, by U.S. Pat. Nos. 3,651,106; 3,652,683; 3,658,858; 3,658,863; and 3,663,584.

In general, resolution by crystallization (i.e., removal of a major proportion of the l-isomer by crystallization) is achieved by mixing d and l 2-(6-methoxy-2-naphthyl)propionic acid in sufficient water to at least partially solubilize the components. The mixture of the d and l isomer will generally be a racemic mixture, although this is not required. Thus, mixtures resulting from prior treatments, where the ratio of d and l isomers has been altered from a racemic mix, may be used, if desired. The addition of base, such as an alkali metal hydroxide, for example, sodium hydroxide, yields a solution of the corresponding salts of the d- and l-isomers (e.g., the sodium salts). Other water-soluble salts of the d- and l-isomers include the potassium and lithium salts, such as prepared by addition of potassium hydroxide or lithium hydroxide, respectively. A water-immiscible, inert, non-polar organic solvent, such as toluene, benzene, xylene, or other non-polar solvent, is added and the solution is heated to a temperature in the range from about 40°C to about 100°C, preferably from about 75°C to about 85°C. While the solution is held at the elevated temperature, a salt of dehydroabietylamine in water is added dropwise with vigorous stirring while the elevated temperature is maintained. Optionally, the salt of dehydroabietylamine can be added to the aqueous phase as a solution in the inert organic solvent (in which it is soluble). In either case, the salt of dehydroabietylamine can be added either before or after the system is heated to the elevated temperature. The reaction mixture is maintained at the elevated temperatue for about one-half to about 4 hours, generally for about 1 to about 2 hours, to promote the interchange of the salt of dehydroabietylamine from the d-isomer to the l-isomer. That is, as the salt of the dehydroabietylamine is added to the solution of the salts of the d- and l-isomers, it will react to form a dehydroabietylamine salt of the isomers, desirably the l-isomer. To the extent that a dehydroabietylamine salt of a d-isomer is formed, however, a corresponding molecule of the l-isomer will not have been bound, as desired, to the dehydroabietylamine salt. By holding the reaction mixture at an elevated temperature, the selective solubilization of the dehydroabietylamine salt of the d-isomer in the aqueous phase is enhanced with the corresponding liberation of the salt of dehydroabietylamine. Upon liberation, the dehydroabietylamine salt is free to react with an l-isomer as is desired. Suitable salts of dehydroabietylamine include the acetate salt and the hydrochloride salt. Other typical salts include the propionate salt, isopropionate salt, butyrate salt, isobutyrate salt, sulfate salt, nitrate salt, and the like. The salt selected should be soluble in the water-immiscible, inert non-polar organic solvent selected, but should be insoluble in water. By insoluble, it is meant that the salt of dehydroabietylamine has a solubility of less then 0.1% in water. This solubility requirement not only enables recovery of the material in subsequent processing, but ensures that the dehydroabietylamine salt will be in the appropriate phase for bonding to the l-isomer. Since it is desired that the salt of dehydroabietylamine be preferentially bound to the l-isomer during this first crystallization, it is necessary to limit the amount of the dehydroabietylamine salt added to the solution so as to achieve that objective. Generally about 1.0 to about 1.3 mole, preferably about 1.2 mole, of the salt of dehydroabietylamine is utilized per mole of the l-isomer. Accordingly, for a racemic mixture of d and l isomers, about 0.6 mole of the salt of dehydroabietylamine will be used per mole of the racemic mixture.

After the reaction mixture is held at the elevated temperature for the desired length of time, it is slowly cooled to ambient temperature. The white crystalline precipitate which results is principally the dehydroabietylamine salt of l 2-(6-methoxy-2-naphthyl)propionic acid. The final temperature to which the solution is taken is chosen by practical considerations, but generally is selected so the temperature difference will be sufficient to provide a high yield of crystals. The crystallizing mixture can be maintained at the lower temperatures until crystallization is complete, or nearby so, usually for about 30 to about 60 minutes. The crystalline precipitate which results is removed by filtration, washed with water, and the washings combined with the original filtrate to provide a mother liquor enriched in the d-isomer. At this point the mother liquor will generally contain about 70–80% d-isomer and about 30–20% l-isomer.

The l-isomer which has been removed from the two-phase system can be racemized by known techniques to give a material having greater d-isomer content. See Dyson U.S. Pat. No. 3,686,183. This material can be recycled, either alone or in combination with other d, l-isomer containing material, to provide additional starting material for the process of the present invention.

The aqueous phase of the mother liquor is treated with an alkali metal hydroxide or an alkaline earth metal hydroxide, such as sodium hydroxide, potassium hydroxide, lithium hydroxide, calcium hydroxide, or magnesium hydroxide, preferably sodium hydroxide, to render basic the aqueous phase, and cleave any residual dehydroabietylamine which will be driven to the organic phase. The organic phase is then separated from the aqueous layer. The aqueous phase remaining is washed with portions of the water-immiscible, inert, non-polar organic solvent and the washings combined with the original solvent material. If desired, the combined organic phase can be discarded; however, since this phase contains residual dehydroabietylamine, it is preferable to recover that material in suitable form for use in further resolution procedures.

A water-soluble inorganic salt, such as the alkali metal and alkaline earth metal halides, nitrates and sulfates, for example, sodium chloride, potassium chloride, lithium chloride, sodium bromide, potassium bromide, lithium bromide, sodium fluoride, sodium iodide, sodium nitrate, sodium sulfate, calcium chloride, magnesium chloride, etc., preferably sodium chloride, is now added to the aqueous phase. Preferably, the aqueous phase is saturated with the inorganic salt, although lesser quantities on the order of 75–80% or so of saturation will aid in the subsequent crystallization of the salt of the d-isomer. The salt selected should be more soluble in water than is the salt of the d-isomer present in the aqueous layer. Desirably it is not so excessively soluble as to require the use of relatively large quantities in substantially saturating the solution. Preferably, the salt should have a reasonably flat solubility curve between the temperature limits to be encountered (i.e., about 10°C and 40°C) so, as the solution thereof is cooled, undue, and undesirable precipitation of the inorganic salt will not occur.

The solution is heated to a temperature somewhat above room temperature, for example, to a temperature in the range from about 25°C to about 40°C, for example 35°C, at which point it should be assured that the solution has the desired amount of inorganic salt in solution. Excessively high temperatures should be avoided to assure that the inorganic salt does not also crystallize during the subsequent cooling step. The solution is then gradually cooled until a temperature somewhat above room temperature, for example about 30°C, is reached, whereupon a seed crystal of the pure salt of the d-isomer is desirably added. Since the addition of the more water-soluble inorganic salt reduces the solubility of the less soluble material (i.e., the salt of the d-isomer), further cooling will cause the d-isomer to preferentially crystallize from the aqueous mother liquor. Accordingly, gradual cooling is continued to a temperature in the range of about 10°C to about 15°C. Once again, the crystallizing mixture is maintained at the lower temperature until crystallization is complete, or nearly so, usually for about 15 to about 60 minutes.

Preferably, the inorganic salt added to the aqueous phase, after separation of the dehydroabietylamine salt of the l-isomer from the two-phase system and removal of the organic phase, has the same cation as the cation of the alkali metal or alkaline earth metal salt of the d-isomer in the aqueous phase. The use of the common ion decreases the solubility of the salt of the d-isomer whereby, as the solution is cooled, and optionally seeded with a pure crystal of the salt of the d-isomer being crystallized, the salt of the d-isomer, which is more abundant in the solution than the corresponding salt of the l-isomer, will preferentially crystallize from the solution thereby yielding d-isomer crystals of high purity. However, it is contemplated that a salt not having such a common cation may be used in the process of the present invention, whereby the crystallization which occurs will be a result of a difference in the solubilities of the various salts in solution.

The crystalline solid which results at this stage of the process [i.e., the salt of d 2-(6-methoxy-2-naphthyl)-propionic acid] is separated by filtration and redissolved in water. The resulting solution is acidified with a mineral acid, such as hydrochloric acid, and the crystalline precipitate so obtained separated by filtration, washed with water and dried. There results a white crystalline product comprising substantially pure d 2-(6-methoxy-2-naphthyl)propionic acid.

As will be seen from the Examples below, this procedure, as described above and without further recrystallization of the d-isomer, yields a product having a purity on the order of about 98–99%. If desired, this purity may be further increased by one or more additional recrystallizations from water solutions thereof, or other solvents as found suitable. Nonetheless, the process of this invention, including, in combination, the use of a salt of dehydroabietylamine as the resolving agent (which yields a less soluble salt of the undesired l-isomer) to enrich the concentration of the d-isomer in the mother liquor and the use of an alkali metal or alkaline earth metal inorganic salt to cause the preferential crystallization of the d-isomer from the mother liquor, yields a product of high purity without the need for tedious, time-consuming steps or numerous multiple recrystallizations to obtain the level of purity obtained, in the first instance, by this process.

DESCRIPTION OF SPECIFIC EMBODIMENTS

The following specific description is given to enable those skilled in this art to more clearly understand and practice the present invention. It should not be considered as a limitation upon the scope of the invention but merely as being illustrative and representative thereof.

EXAMPLE I

100 Milliliters of water and 23 grams (0.1 mole) of racemic 2-(6-methoxy-2-naphthyl)propionic acid are added to a 1-liter flask. The mixture is agitated and neutralized to a pH of 9.5 by the addition of a 50% (weight/weight) aqueous solution of sodium hydroxide, to give a solution of the sodium salt of d, l 1,2-(6-methoxy-2-naphthyl)propionic acid. After 200 grams of toluene are added to the solution, the reaction mixture is heated to 80°C and 21.1 grams (0.06 mole) of dehydroabietylamine acetate in 100 ml. of water are added with vigorous stirring during a 30 minute period while the temperature of 80°C is maintained. After the addition of the dehydroabietylamine is completed, the reaction mixture is held at 80°C for 1 hour and then cooled to ambient temperature over a period of 2 hours. The crystalline precipitate consisting of the dehydroabietylamine salt of the l 2-(6-methoxy-2-naphthyl)propionic acid is removed by filtration and washed with 25 milliliters of water. The washings are combined with the original filtrate and transferred to a 1-liter separatory funnel. The aqueous phase is adjusted to a pH of 10 with dilute sodium hydroxide solution. The aqueous phase is separated from the upper toluene layer, and washed twice with 50 milliliter portions of toluene which are combined with the original toluene layer. 15 Grams of sodium chloride are added to the aqueous layer which is then warmed to 35°C. The aqueous layer is cooled slowly over a 2 hour period. When the temperature reaches 30°C the aqueous layer is seeded with a pure crystal of the sodium salt of d 2-(6-methoxy-2-naphthyl)propionic acid, after which cooling is continued with agitation to a temperature of 13°C. The solution is stirred at this temperature for α]15 minutes. The crystalline solid which results is removed by filtration and redissolved in 200 milliliters of water. The resulting solution is acidified with hydrochloric acid to a pH of 2. The white crystalline precipitate which results is separated by filtration, washed with water at 0°C until the washings are essentially neutral, and dried in vacuuo at 50°C for 2 hours to yield 4 grams of d 2-(6-methoxy-2-naphthyl)propionic acid [m.pt. 154°–155°C; $[\alpha]_D^{25} = 64.6$ (1% in chloroform)]. This optical rotation represents a purity of about 98.9%.

EXAMPLE II

The procedure of Example I is repeated, except 19.3 grams (0.06 mole) of dehydroabietylamine hydrochloride are substituted for the 21.1 grams of dehydroabietylamine acetate utilized in Example I. d 2-(6-Methoxy-2-naphthyl)propionic acid in the same yield and of the same quality is obtained.

EXAMPLE III 24.8 Grams of a mixture of about 89.3% d- and about 10.7% l- 2-(6-methoxy-2-naphthyl)propionic acid and 786 grams of water are added to a one-liter flask. The aqueous phase is adjusted to a pH of 9.5 with a 50% (weight/weight) aqueous solution of sodium hydroxide. 78.6 Grams of sodium chloride are added to the aqueous phase which is then warmed to 32°C. The aqueous layer is slowly cooled with agitation to a temperature of about 11°C, then warmed slowly to 13°C. The solution is stirred at this temperature for about 15 minutes. The crystalline solid which results is removed by filtration and redissolved in 600 milliliters of water, and acidified with hydrochloric acid to a pH of about 1. The white crystalline precipitate which results is separated by filtration, washed with water at 0°C until the washings are essentially neutral, and dried in vacuuo at 55°C for 2 hours to yield 15.0 grams of d 2-(6-methoxy-2-naphthyl)propionic acid [m.pt. 153.5°–155°C; $[\alpha]_D^{25}$ = 64.61 (1% in chloroform)].

While the present invention has been described with reference to specific embodiments thereof, it should be understood by those skilled in this art that various changes may be made and equivalents may be substituted without departing from the true spirit and scope of the invention. In addition, many modifications may be made to adapt a particular situation, material or composition of matter, process, process step or steps, or then-present objective to the spirit of this invention without departing from its essential teachings.

What is claimed is:

1. A process for separating d 2-(6-methoxy-2-naphthyl)propionic acid acid from a mixture of d and l 2-(6-methoxy-2-naphthyl)propionic acid comprising providing a heated two-phase system having water as an aqueous phase and a water-immiscible, inert non-polar organic solvent as an organic phase, a mixture of a water-soluble salt of d 2-(6-methoxy-2-naphthyl)propionic acid and a water-soluble salt of l 2-(6-methoxy-2-naphthyl)propionic acid, and a salt of dehydroabietylamine which is soluble in said organic phase but is insoluble in said aqueous phase at the temperature to which said system is heated in an amount equal to about 1.0–1.3 mole per mole of said water soluble salt of l-2-(6-methoxy-2-naphthyl)propionic acid; holding said two-phase system at said elevated temperature to promote the formation of the dehydroabietylamine salt of l 2-(6-methoxy-2-naphthyl)propionic acid which is less soluble in said two-phase system than is the dehydroabietylamine salt of d 2-(6-methoxy-2-naphthyl)-propionic acid; crystallizing said dehydroabietylamine salt of l 2-(6 -methoxy-2-naphthyl)propionic acid; separating said crystallized salt from said two-phase system to thereby provide a mother liquor which is enriched in the water-soluble salt of d 2-(6-methoxy-2-naphthyl)-propionic acid; separating said aqueous phase from said organic phase; and salting out a salt of d 2-(6-methoxy-2-naphthyl)propionic acid by adding to said aqueous phase an inorganic acid which is more soluble in said aqueous phase than is said water-soluble salt of d 2-(6-methoxy-2-naphthyl)propionic acid and crystallizing the least water-soluble salt of d 2-(6-methoxy-2-naphthyl)propionic acid from said aqueous phase.

2. The process of claim 1 further including the steps of dissolving said crystalline salt of d 2-(6-methoxy-2-naphthyl)propionic acid in a solvent, acidifying said solution with a mineral acid to yield d 2-(6-methoxy-2-naphthyl)propionic acid, and crystallizing substantially pure d 2-(6-methoxy-2-naphthyl)propionic acid therefrom.

3. The process of claim 2 further including the step of subjecting said substantially pure d 2-(6-methoxy-2-naphthyl)propionic acid to at least one additional recrystallization to further increase the purity thereof.

4. The process of claim 1 wherein said water-immiscible, inert, non-polar solvent is selected from the group consisting of benzene, toluene and xylene.

5. The process of claim 1 wherein said water-immiscible, inert, non-polar organic solvent is toluene.

6. The process of claim 1 wherein said elevated temperature is from about 75°C to about 85°C.

7. The process of claim 1 wherein said salt of dehydroabietylamine is selected from the group consisting of dehydroabietylamine acetate and dehydroabietylamine hydrochoride.

8. The process of claim 1 wherein about 1.2 of said salt of dehydroabietylamine is added per mole of l 2-(6-methoxy-2-naphthyl)propionic acid in said mixture.

9. The process of claim 1 wherein, after said crystallized dehydroabietylamine salt of l 2-(6-methoxy-2-naphthyl)propionic acid is separated from said two-phase system and prior to said aqueous phase being separated from said organic phase, said method further includes the step of rendering said aqueous phase basic to drive residual dehydroabietylamine to said organic phase.

10. The process of claim 9 wherein said aqueous phase is rendered basic by the addition thereto of an alkali metal hydroxide.

11. The process of claim 9 wherein said aqueous phase is rendered basic by the addition thereto of sodium hydroxide.

12. The process of claim 1 wherein said inorganic salt is selected from the group consisting of the sodium chloride, potassium chloride, lithium chloride, calcium chloride and magnesium chloride.

13. The process of claim 1 wherein said inorganic salt has a reasonably flat solubility curve between about 10°C and about 40°C.

14. The process of claim 1 wherein said inorganic salt is sodium chloride.

15. The process of claim 1 wherein said inorganic salt has the same cation as said water-soluble salts of d and l 2-(6-methoxy-2-naphthyl)propionic acid.

16. The process of claim 1 wherein, after said inorganic salt is added to said aqueous phase, said aqueous phase is heated to above room temperature while maintaining at least a substantially saturated state, and said salt of d 2-(6-methoxy-2-naphthyl)propionic acid is crystallized by seeding said aqueous phase with a crystal of said salt of d 2-(6-methoxy-2-naphthyl)propionic acid and cooling said seeded aqueous phase to a temperature below room temperature.

17. The process of claim 16 wherein said temperature above room temperature is about 35°C, and said temperature below room temperature is about 10–15°C.

18. A process for separating d 2-(6-methoxy-2-naphthyl)propionic acid from a mixture of d and l 2-(6-methoxy-2-naphthyl)propionic acid comprising providing a heated two-phase system having water as an aqueous phase and a water-immiscible inert, non-polar organic solvent as an organic phase, a mixture of the alkali metal salts of d and l 2-(6-methoxy-2-naphthyl)-propionic acid, and a salt of dehydroabietylamine which is soluble in said organic phase but is insoluble in said aqueous phase at the temperature to which said system is heated in an amount equal to about 1.0–1.3 mole per mole of said water soluble salt of l-2-(6-methoxy-2-naphthyl)propionic acid; holding said two-phase system at a temperature in the range from about 75°C to 85°C to promote the formation of the dehydroabietylamine salt of l 2-(6-methoxy-2-naphthyl)propionic acid which is less soluble in said two-phase system than is the dehydroabietylamine salt of d 2-(6-methoxy-2-naphthyl)propionic acid; crystallizing said dehydroabietylamine salt of l 2-(6-methoxy-2-naphthyl)propionic acid; separating said crystallized salt from said two-phase system to provide a mother liquor enriched in the alkali metal salt of d 2-(6-methoxy-2-naphthyl)propionic acid; treating said aqueous phase with an alkali metal hydroxide to reform said alkali metal salt of d 2-(6-methoxy-2-naphthyl)propionic acid in said aqueous phase and drive residual dehydroabietylamine to said organic phase; separating said aqueous phase from said organic phase; and salting out said alkali metal salt of d 2-(6-methoxy-2-naphthyl)-propionic acid by at least substantially saturating said aqueous pahse with an alkali metal inorganic salt which is more soluble in said aqueous phase than is said alkali metal salt of d 2-(6-methoxy-2-naphthyl)propionic acid, heating said aqueous phase to above room temperature while maintaining at least a substantially saturated state, and crystallizing said alkali metal salt of d 2-(6-methoxy-2-naphthyl)propionic acid from said aqueous phase be seeding said aqueous phase with a crystal of said alkali metal salt of d 2-(6-methoxy-2-naphthyl)propionic acid and cooling said seeded aqueous phase to a temperature below room temperature.

19. The process of claim 18 further including the steps of dissolving said crystalline salt of d 2-(6-methoxy-1-naphthyl)propionic acid in a solvent, acidifying said solution with a mineral acid to yield d 2-(6-methoxy-2-naphthyl)propionic acid, and crystallizing substantially pure d 2-(6-methoxy-2-naphthyl)propionic acid therefrom.

20. The process of claim 29 further including the step of subjecting said substantially pure d 2-(6-methoxy-2-naphthyl)propionic acid to at least one additional recrystallization to further increase the purity thereof.

21. The process of claim 18 wherein said alkali metal hydroxide is sodium hydroxide.

22. The process of claim 18 wherein said water-immiscible, inert, non-polar solvent is selected from the group consisting of benzene, toluene and xylene.

23. The process of claim 18 wherein said water-immiscible, inert, non-polar solvent is toluene.

24. The process of claim 18 wherein said salt of dehydroabietylamine is selected from the group consisting of dehydroabietylamine acetate and dehydroabietylamine hydrochloride.

25. The process of claim 18 wherein about 1.2 of said salt of dehydroabietylamine is added per mole of l 2-(6-methoxy-2-naphthyl)propionic acid in said mixture.

26. The process of claim 18 wherein said alkali metal inorganic salt is selected from the group consisting of the halides, nitrates and sulfates of an alkali metal.

27. The process of claim 18 wherein said alkali metal inorganic salt has a reasonably flat solubility curve between about 10°C and about 40°C.

28. The process of claim 18 wherein said alkali metal inorganic salt is sodium chloride.

29. The process of claim 18 wherein said alkali metal inorganic salt has the same alkali metal cation as said alkali metal salts of said d and l 2-(6-methoxy-2-naphthyl)propionic acid.

30. The process of claim 18 wherein said temperature above room temperature is about 35°C, and said temperature below room temperature is about 10°C–15°C.

* * * * *

UNITED STATES PATENT OFFICE
CERTIFICATE OF CORRECTION

Patent No. 3,904,683    Dated September 9, 1975

Inventor(s) John T. Day et al

It is certified that error appears in the above-identified patent and that said Letters Patent are hereby corrected as shown below:

Column 6, line 45, delete "α]". Column 9, line 35, change "methoxy-1- naphthyl)" to -- methoxy-2-naphthyl) --. Column 10, line 3, change "claim 29" to -- claim 19 --.

Signed and Sealed this second Day of March 1976

[SEAL]

Attest:

RUTH C. MASON
Attesting Officer

C. MARSHALL DANN
Commissioner of Patents and Trademarks